(No Model.) 5 Sheets—Sheet 2.

G. A. BRONDER.
GAS RETORT CHARGING APPARATUS.

No. 534,422. Patented Feb. 19, 1895.

Witnesses:
C. E. Lundgren
George Barry.

Inventor:
Gaston A. Bronder
by attorneys
Brown & Heward (No Model.) 5 Sheets—Sheet 3.
G. A. BRONDER.
GAS RETORT CHARGING APPARATUS.

No. 534,422. Patented Feb. 19, 1895.

Fig. 3.

Witnesses:
O. E. Sundgren
George Barry.

Inventor:
Gaston A. Bronder
by attorneys
Brown & Seward

(No Model.) 5 Sheets—Sheet 4.

G. A. BRONDER.
GAS RETORT CHARGING APPARATUS.

No. 534,422. Patented Feb. 19, 1895.

(No Model.) 5 Sheets—Sheet 5.
G. A. BRONDER.
GAS RETORT CHARGING APPARATUS.

No. 534,422. Patented Feb. 19, 1895.

Witnesses:—
George Barry
C. E. Sundgren

Inventor:—
Gaston A. Bronder
by attorneys

UNITED STATES PATENT OFFICE.

GASTON A. BRONDER, OF NEW YORK, N. Y.

GAS-RETORT-CHARGING APPARATUS.

SPECIFICATION forming part of Letters Patent No. 534,422, dated February 19, 1895.

Application filed January 18, 1894. Serial No. 497,222. (No model.)

*To all whom it may concern:*

Be it known that I, GASTON A. BRONDER, of the city and county of New York, in the State of New York, have invented a new and useful Improvement in Gas-Retort-Charging Apparatus, of which the following is a specification.

To enable the object and nature of my invention to be more clearly understood I will first refer briefly to the arrangement of retorts and coal-bins in the retort house of a gas works.

Generally the retort house has one or more retort stacks which have from one hundred to one hundred and fifty retorts on each side with projecting mouth pieces, the said retorts generally ranging in three tiers, the several retorts of the three tiers being situated directly one above another.

An apparatus embodying the whole of my invention is intended to receive from a suitably located elevated bin, a sufficient quantity of coal to charge all or any number of the retorts on one side of a stack, to run along the whole length of the range of retorts and to deliver the coal in automatically weighed quantities to one retort at a time in each of the tiers or in as many of them as may be desired.

I will now proceed to describe with reference to the accompanying drawings, an apparatus embodying my invention and to afterward point out its novelty in the claims.

Similar letters of reference designate corresponding parts in all the figures.

Figure 1:
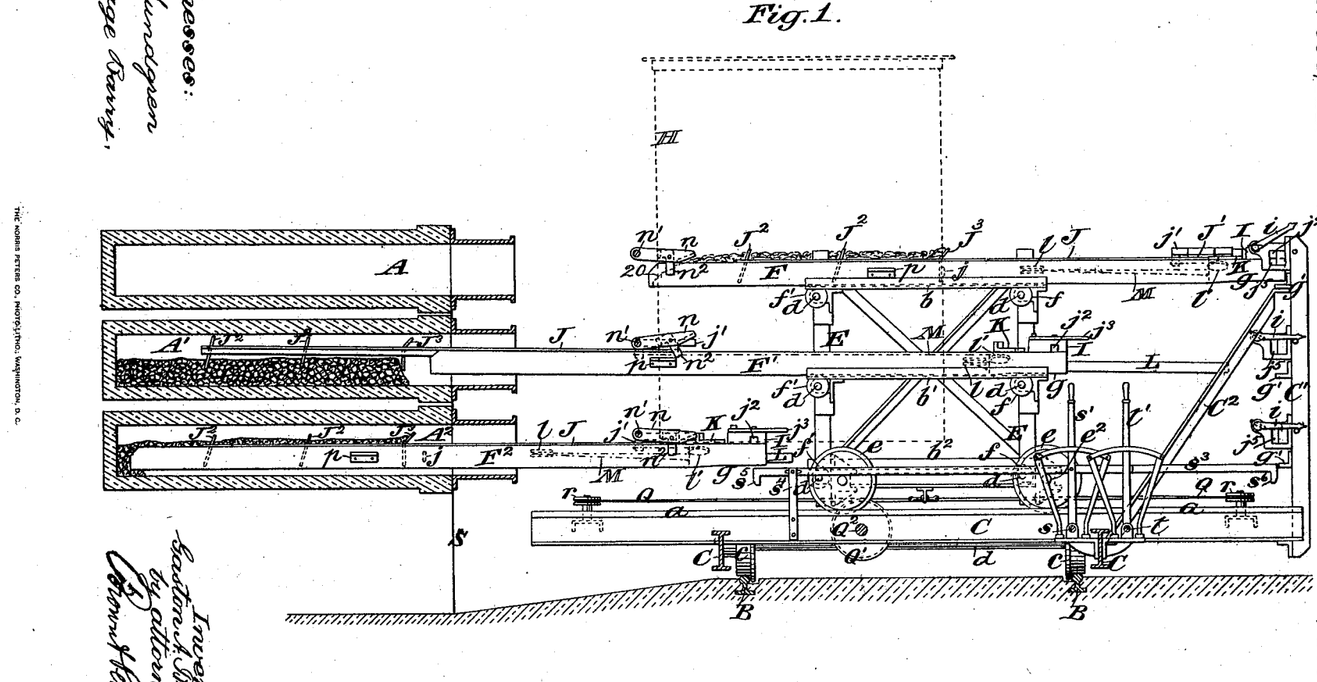
Figure 1 represents a vertical sectional view of three retorts belonging to three different tiers arranged one above another and a corresponding sectional elevation of my apparatus.

Referring first to Fig. 1, A A' A² are three retorts arranged one above another in a stack the face of which is indicated by the line S.

B (Figs. 1, 2, 3, 10, and 11) is a railway track running in front of the retorts along the whole length of the stack or stacks to be charged by my apparatus and having running upon it the supporting wheels $c\,c$ of the carriage C C' C² which I will hereinafter designate as the main carriage consisting of a horizontal platform C, uprights C' and diagonal braces C². Upon this carriage the whole of my apparatus is mounted.

Figure 2:
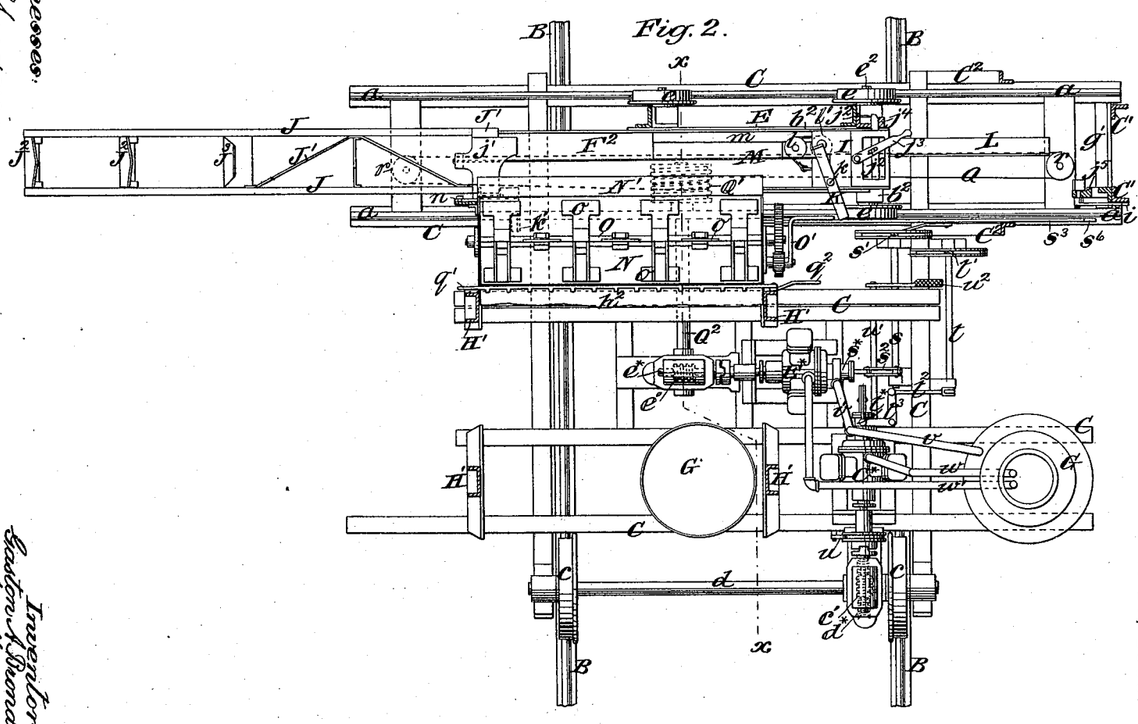
Fig. 2 is a plan view of my apparatus having the feeding hopper partly removed to expose the parts below.
Figure 3:
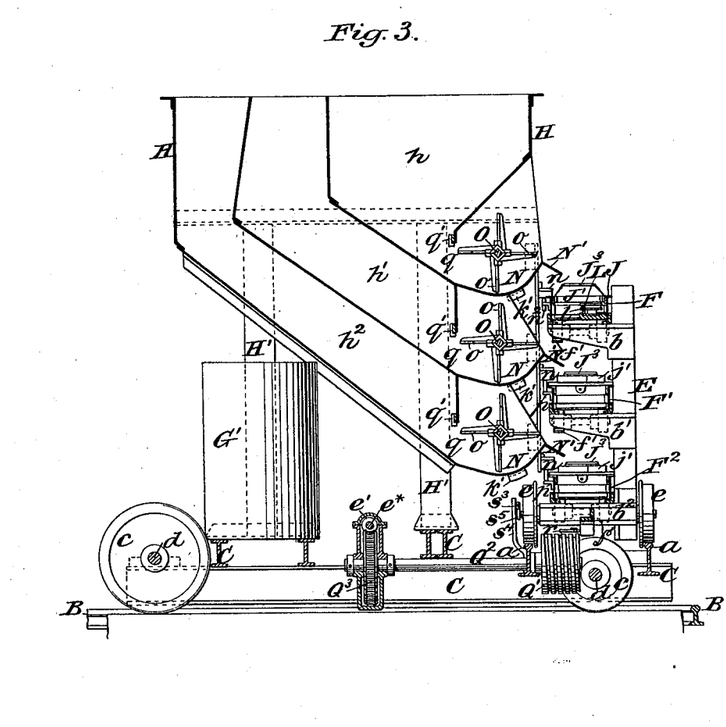
Fig. 3 represents a vertical section of my apparatus at right angles to Fig. 1, taken approximately in the line $x\,x$ of Fig. 2.
Figure 10:
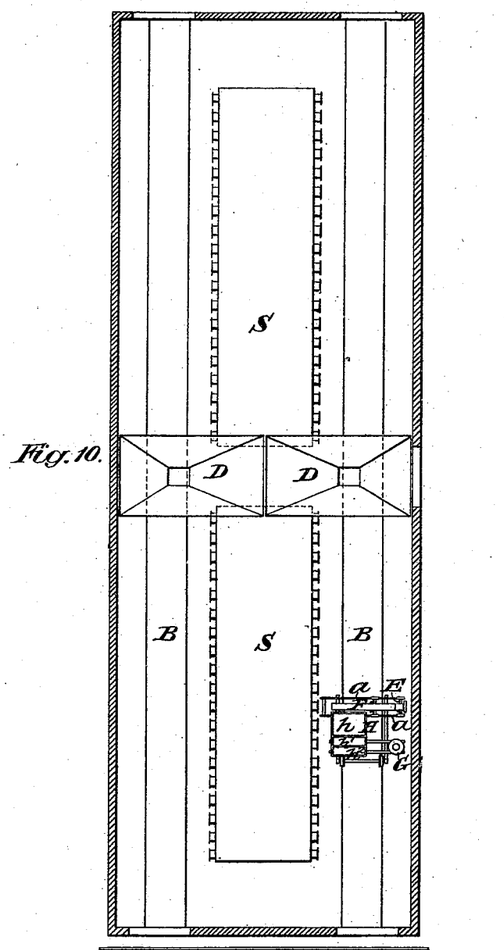
Fig. 10 is a plan view of a retort house with the roof removed to show the arrangement of the retorts, the coal bins and the railway tracks upon which my apparatus runs to receive the coal from the said bins and deliver it to the retorts, showing also an outline diagram of my apparatus.
Figure 11:
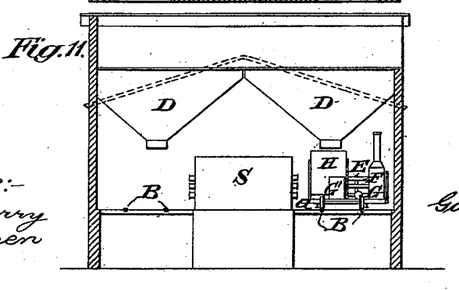
Fig. 11 represents a transverse section corresponding with Fig. 10.

In Figs. 1, 2, and 3, I have represented only one of my charging apparatuses as that is sufficient for the illustration of my invention, but for a stack in which there are retorts on both sides as is usual, I should use one of such apparatuses on each side of the stack, as may be understood by reference to Figs. 10 and 11 in which a stationary track B is shown on each side of the stack. These figures also show coal bins D D arranged above the stacks at such height that my apparatus may pass under them to be loaded with coal to be carried along the whole length of the stacks.

Fig. 10 shows two stacks S S arranged in line with each other with a space between them over which at a point central to the length of the stacks, are arranged the two coal bins D D one for the charging apparatus on one side and the other for the corresponding apparatus on the other side of the stacks, each charging apparatus serving to charge the retorts on one side of the two stacks. The bins may be filled by any suitable means.

The main carriage C C' C² has embodied with it or fixed upon it a track $a\,a$ which is arranged transversely to the stationary track B and in a direction corresponding with the length of the retorts, the said track $a\ a$ receiving the supporting wheels $e\ e$ of a second carriage E which I term the scoop carriage and which carries the scoops F F' F² which correspond in number with the tiers of retorts in the stack and which are arranged one above another as shown in Figs. 1 and 3, at such heights as to be capable of entering respectively a retort of each of the tiers in the stack. The main carriage C C' C² has also supported upon it by columns H', a coal hopper H for receiving coal from the bin or bins and for supplying it to the scoops F F' F², the said hopper being situated at one side of the scoop carriage track $a\ a$ and being, as shown in Fig. 3, divided into three compartments $h$ $h'\ h^2$ of about equal capacity, one for supplying each of the scoops. The position of the said hopper is indicated in Fig. 1 in dotted outline, the section of said figure being such as to omit the hopper. Only the compartment $h^2$ is shown in Fig. 2, the section line of which is below $h\ h'$. The hopper and its appurtenances will be hereinafter more fully described. In the example represented there are also (see Fig. 2) on the main carriage C C' C², two steam engines C* and E* and a boiler G for supplying the said engines with steam, the engine C* being for propelling the main carriage along the stationary track B and along the range of retorts and the engine E* being for propelling the scoop carriage E back and forth on the track $a\ a$ for the purpose of carrying the scoops forward from the side of the coal hopper into the retorts to charge the latter and of withdrawing the scoops from the retorts. There is also represented on the said carriage a water tank G' for supplying the boiler G with water.

The scoop carriage E is provided with scoop supports consisting of shelves or brackets $b$ $b'\ b^2$ arranged one above another, one for each scoop, and under each of these shelves or brackets are bearings for the journals $d\ d$ of two rollers $f$ and $f'$ upon which the scoops are placed, the upper parts of said rollers protruding upward through openings in the shelf or bracket, said roller $f$ being at the rear end of the carriage and the said roller $f'$ being at the front end of the carriage as shown in Fig. 1. The front roller $f'$ of each scoop-support constitutes the fulcrum upon which the scoop oscillates as a scale beam for weighing the coal received from the charging hopper H as will be hereinafter described, and both rollers serve to reduce the friction upon the carriage of any scoop that may be locked back to the main carriage C C' C² in which condition the uppermost scoop F is shown in Fig. 1, when it is desired to keep that scoop inoperative while the scoop carriage runs back and forth with the other scoops, as when it is only desired to charge retorts in less than the whole number of tiers as will be hereinafter explained.

To provide for locking the several scoops or any number of them operatively to the scoop carriage E as is illustrated by F' in Figs. 1 and 2, or for locking either one or more of them to the main carriage C C' C² to render it or them inoperative as is illustrated by F in Fig. 1, there is provided on the weight I or rear portion of each scoop a locking device represented as consisting of a transversely sliding bolt $j^2$ manipulated by a hand-lever $j^3$. By sliding the said bolt out from the scoop in one direction to the position shown in Figs. 2 and 5, the said bolt is made to enter a staple $j^4$ on the scoop carriage and so to lock the scoop operatively to that carriage, and by sliding the said bolt in the opposite direction it is made to enter a staple $j^5$ on the main carriage to lock the scoop to that carriage where it is inoperative. The staples $j^4$ $j^5$ must be sufficiently elongated in an upward direction to permit the upward and downward movement of the scoop in its operation as a scale beam as will be hereinafter further explained.

The scoops, the construction of which is best shown in Figs. 4, 5, 6, and 7, consist each of a long box or trough built of steel and open at the top and the forward end. Their sides and bottoms may be double and lined with asbestos to make them heat proof. The rear end of the bottom is cut away or recessed as shown at $g$ in Figs. 1 and 4, to permit the oscillation of the scoop on the forward rollers $f'$, and at the said end there is a permanent weight I by which the scoop is balanced horizontally with the coal charge in it and weighted down when empty so as to lift or tilt up the forward end somewhat. This permanent weight may be sufficient for the minimum charge and changeable weights may be added for heavier charges. While the scoop is in use it is locked to its carriage E, and when it is brought back by this carriage to the position for charging, its back end is stopped by and eventually lies on an angle-iron bar $g'$ fastened to the main carriage C C' C² right under an indicating hand $i$. When the proper coal charge is put in the scoop it balances the weight I, weighing the coal exactly and lifting the indicating hand $i$ showing to the attendant who has control of the charging as will be hereinafter explained, that the proper charge is attained.

Figure 4:
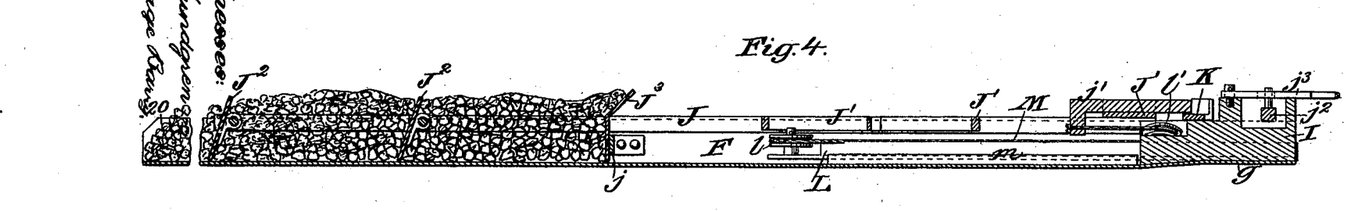
Fig. 4 represents a longitudinal section of one of the coal scoops for charging the retorts and the scraping apparatus with which the said scoop is furnished for discharging the coal therefrom into the retort.

Within the scoop and lying loose upon the upper edges thereof, is a scraper frame J J' consisting of angle-iron side bars J and cross braces J' and carrying a series of scrapers $J^2$ $J^3$ of which several $J^2$ are pivoted to the side bars J in such manner that their lower edges will swing forward to allow them to pass backward freely over any coal underneath them but will stop against the bottom of the scoop when they meet any resistance from the coal in front of them. The rearmost one $J^3$ of these scrapers is rigid and it forms the back of the coal space in the scoop while it is drawn back against a stop $j$ in the scoop as shown in Fig. 4. The scraper frame is capable of a movement back and forth relatively to the scoop to an extent a little greater than the length of that part of the scoop which contains the charge in order that first, after the scoop with the scraper frame in it has been moved forward into the retort with the charge of coal in it nearly to the back end of the retort as illustrated by F² in Fig. 1 the scraper may have a still further movement to push the charge of coal up to the extreme rear end of the retort, and second that the scoop may, while the scrapers remain thus pushed forward, move back far enough as illustrated by F' in Fig. 1 to be withdrawn from the charge in the retort while the scrapers continue to hold back the charge. In order to counterbalance the weight of that portion of the scraper frame which with the scrapers projects beyond the end of the scoop during and immediately after the discharge of the scoop into the retort, as just described, the said frame is loaded at its rear end by a weight $j'$.

For the purpose of producing the continued movement just described of the scrapers within the scoop beyond the movement of the latter within the retort, a lever K is pivoted by a fulcrum pin $k$ to the weight I or back part of the scoop, one end of the said lever bearing against the said weight $j'$ or back part of the scraper frame and the other end projecting laterally from the scoop so that during the latter part of the forward movement of the scoop the said projecting end comes in contact with a stop $k'$ affixed to the bottom of its respective hopper after which the continued forward movement of the scoop causes the scraper frame and scrapers to move forward with an accelerated velocity relatively to the scraper.

The detention of the scrapers within the retort for the purpose of scraping the charge from the scoop as the latter is moved back by the scoop-carriage is effected by means of a hooked gravity pawl $n$ which is pivoted by a pin $n'$ to the main carriage. This pawl is shown in Fig. 1 and partly in Fig. 2 but is better shown in Figs. 8 and 9, Fig. 8 being a side view of parts of the said carriage, of the scoop and of the scraper frame and Fig. 9 being a plan corresponding with Fig. 8, the rearmost cross brace J' of the said frame passing under and past the hook of the said pawl as the said frame completes its forward movement and being held by said pawl until the scoop has been drawn back clear of the charge in the retort, when the said pawl is tripped out of engagement with the scraper by means of a trip piece $p$ on the outside of the scoop as shown on the scoop F in Fig. 1. This projection does not act directly upon the pawl $n$ but acts upon an angular tappet piece $n^2$ which is pivoted to the said pawl and the upper part of which overlies the edge of the scraper frame. After the scoop has been drawn back clear of the charge the said trip piece $p$ on its side strikes the lower pendent portion of the tappet and so presses down its upper part on the edge of the scraper frame that the said tappet operates as a lever to raise the pawl $n$ and unlock the said frame.

Figures 5, 6, 7, 8, 9:
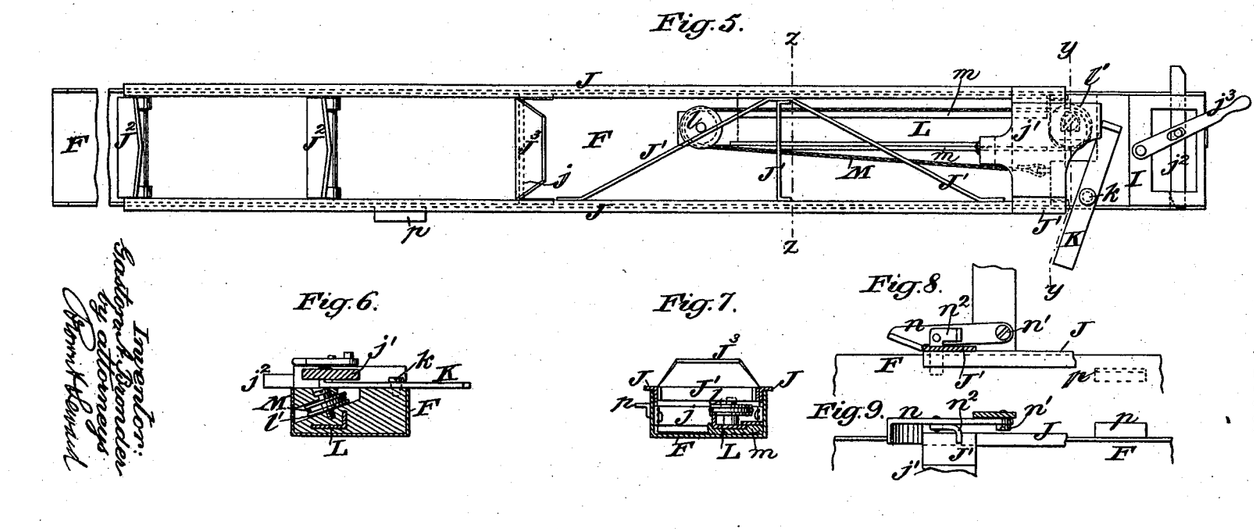
Fig. 5 is a plan view corresponding with Fig. 4.
Fig. 6 represents a transverse section in the line $y\,y$ of Fig. 5, looking to the right.
Fig. 7 represents a transverse section in the line $z\,z$ of Fig. 5, looking to the left.
Figs. 8 and 9 are detail views which will be hereinafter explained.

The drawing back of the scraper frame to bring the scrapers back into the scoop is effected by means of a bar L which I term the backing bar, two pulleys $l\ l'$ and a wire rope or chain M shown in Figs. 4 and 5 and also shown partly in Figs. 1, 2, 6 and 7. The backing bar is fitted to slide back and forth lengthwise of the scoop in guides $m$ provided within the frame. While the scraper frame is held stationary as above described to permit the discharge of the scoop into the retort by the drawing back of the scoop, the backing bar L is projected back through the rear of the scoop as shown in the scoop F', with a movement of two to one in proportion to the movement of the scoop, by means of the pull of the scoop on rope or chain M passing around the pulleys $l\ l'$. This projection of the backing bar continues until the scraper frame has been unlocked by the lifting of the pawl $n$. The backing bar is then immediately, by the continued movement of the scoop, brought against the stop $g'$ hereinbefore mentioned on the main carriage C C' C² and by the further continued backward movement of the scoop while the said bar is so stopped, the said bar is caused to be returned with the scoop and, by the action of the rope or chain M and pulleys $l\ l'$, to draw back the scrapers to the position they are to occupy while the latter is being charged and while it is running forward to charge the retort, which position is shown in Figs. 4 and 5 and in the scoop F in Fig. 1.

I will now complete the description of the hopper and the means of charging the scoops therefrom. The compartments $h\ h'\ h^2$ constitute separate hoppers having their mouths side by side and at or nearly at the same level for receiving the coal but having their throats or delivery openings $q$ at the sides and one above another. Each of these compartments or separate hoppers has at its throat or delivery opening a retaining trough N into which the coal descends by gravitation and which, when filled, stops the coal from further descending. These troughs N are open at the sides toward the scoop carriage, the said carriage being also open above the scoops toward the said troughs and each trough having at its outer edge a chute N' to project over its respective scoop. In the center of this trough is a rotary scraper consisting of a shaft O working in bearings in the ends of the trough and a number of attached scraping blades or buckets $o\ o$ which extend the whole length of the hopper and trough, which length is equal to the length intended for the coal layer in the scoop. The shaft is manipulated by a hand-crank O' (see Fig. 2) by which the attendant on the machine may turn it for the purpose of scraping the coal in desired quantity from the bottom of the trough upward and over the edge of the latter, whence it runs down the chute N' into the respective scoop.

To prevent any jamming of the coal in the throat $q$ of the hopper behind the trough N, there is provided along the upper edge of the opening between the said throat and the retaining trough N, a horizontal bar or slide $q'$ (see Figs. 2 and 3) on which are a number of ribs or projections at short intervals throughout its length for stirring or loosening the coal, the said bar being movable from time to time for the purpose by a hand-lever $q^2$. (See Fig. 2.)

The steam engine E* hereinbefore briefly referred to for driving the scoop carriage, gives motion to the said carriage by means of a chain or wire rope Q which runs around and is driven by a drum Q' on a horizontal shaft $Q^2$ mounted in suitable bearings on the main carriage C C' $C^2$, the said chain or rope running around two pulleys $r$ $r$ arranged on the said carriage near opposite ends thereof. The said shaft $Q^2$ is geared with and derives motion from the shaft $e^*$ of the engine E* by an endless screw $e'$ on the said shaft $e^*$ and a worm gear $Q^3$ on the said shaft $Q^2$. The engine E* is furnished with a reversing valve $s^*$ and reversing gear which may be of any suitable kind. The reversing gear is represented in Figs. 1 and 2 as consisting in part of a rock-shaft $s$ furnished with a hand lever $s'$ and with a connection $s^2$ with the engine valve which is both a reversing valve and a stop valve. In order to provide for stopping this engine E* automatically at each end of the movement of the scoop carriage, the hand lever $s'$ has connected with it a horizontal tappet bar $s^3$ (see Figs. 1 and 2) which runs on a guide $s^4$ secured to the main carriage. The turned down ends of the said bar constitute tappets $s^5$ and $s^6$ against which the axles $e^2$ of the rear wheels $e$ $e$ of the carriage E respectively strike as the carriage approaches the end of its forward or backward movement for the purpose of shifting the lever $s'$ to a position to stop the engine which with the carriage E when thus stopped continue at rest until again started by the attendant.

The steam engine C* hereinbefore referred to for moving the main carriage along the face of the retort stack is geared with one of the axles $d$ of the main carriage by an endless screw $c^*$ on the shaft of the said engine and a worm gear $d^*$ on the said axle. The said engine C* is furnished with a reversing valve $t^*$ and reversing gear which may be of any suitable kind. The reversing gear is represented in Figs. 1 and 2 as consisting in part of a rock-shaft $t$ furnished with a hand lever $t'$ and with connections $t^2$ $t^3$ with the reversing valve $t^*$ which is also a stop valve. To enable the speed of the machine on the track B to be slowed before stopping it opposite the retorts, a brake $u$ actuated by a rock-shaft $u'$ and a foot treadle $u^2$ (Fig. 2) is applied to the shaft of the engine C* to be operated by the attendant standing in a position in which he can manipulate the engine levers $s'$ and $t'$ and the hand crank O' of the scrapers $o$ $o$ by which the coal is delivered from the hopper troughs N to the scoops.

In Fig. 2, I have represented the steam pipe $v$ $v'$ for supplying steam from the boiler G to the two engines C* E* and the exhaust pipes $w$ $w'$ for exhausting the steam from the engines to the smoke stack of the boiler.

Having now described the details of the apparatus or machine, I will, before describing the operation of the apparatus in charging gas retorts, explain that in Fig. 1 wherein the operation is fully illustrated, only one of the scoops, viz: F', is shown in operative connection with the scoop carriage E, the lower scoop and its appurtenances being shown in the position which if connected operatively with the said carriage, they would occupy when said carriage is in its most forward position, and the uppermost scoop F is shown in the position it would occupy when the said carriage is in its rearmost position. I have thus shown these three positions of the scoops in one figure to avoid the necessity of three different representations of the side elevation of the machine with the scoop carriage in as many different positions. The scoop carriage in this figure is shown in the act of running back with the scoop F', the scrapers of which are still in the retort wherein they have deposited the coal from said scoop.

I will now proceed to describe the charging operation first supposing all the compartments of the hopper H to have been charged under and from the elevated bin D and the scoop carriage to be in its rearmost position close to the rear uprights C' of the main carriage. The empty scoops or as many of them as are to be used are locked to the said carriage E and are then opposite the hoppers with their front parts tripped up to receive coal from the troughs N of the hoppers. The main carriage being now brought to a position in which the scoops are opposite the retorts, the scoops are then charged, not directly from their respective hoppers, but from the troughs N which are kept supplied from the hoppers, the charging being entirely under the control of the attendant who, by means of the hand cranks O', turns the scraper shafts O and scrapers $o$, which latter raise the coal from the retaining troughs and cause its delivery therefrom over the chutes N' into the scoops. The attendant as he thus loads a scoop watches the index hand $i$ until, when the scoop has received the weight of coal necessary for the charge, the weight I is counterbalanced and raised and is caused to raise the index hand $i$. The coal thus loaded and weighed in the scoop lies between and in front of the scrapers $J^2$ $J^2$ $J^3$ which are in their rearmost position in the scoops. The engine E* is now started to run the scoop carriage forward and carry the coal-laden scoops into the retorts, the front ends of the scoops being brought not quite to the rear end of the retort as illustrated by the scoop $F^2$ in Fig. 1. In this position the movement of the scoop-carriage, scoops and scrapers is arrested by the automatic stoppage of the engine E* produced by the rear axle $e^2$ of the said carriage striking the front tappet $s^5$ of the tappet rod $s^3$, but just before this stoppage occurred the forward movement of the scraper frames and scrapers had been accelerated by the action of the lever K (see Fig. 5) as hereinbefore explained and the coal in the scoops, which up to that time had its front portion sloping backward from the end of the scoop as indicated at 20 in Fig. 4, was by the said accelerated movement pushed forward in the scoops and a portion of it was pushed out therefrom as illustrated in the scoop $F^2$ in Fig. 1 into the rear parts of the retorts and against the rear ends of the latter where they are the hotest and the generation of the gas is most effective. The scraper frames are, by the accelerated movement just mentioned, brought to such a position that their rear cross braces J′ pass the hooks of the pawls $n$.

To run back the scoop carriage and scoops the attendant reverses the engine E* by the hand lever $s'$ but during the first part of this movement the scraper frames are detained by the pawls $n$ and the scrapers are held back and the coal being held back by them is discharged from the scoops into the retorts as illustrated by the retort A′ and scoop $F^2$ in Fig. 1. This discharge of the coal from the scoops lightens the front ends of the latter so that the said ends and the scrapers are lifted (as illustrated by the scoop F′ in Fig. 1) by the weights I and $j'$ on the rear ends of the scoop and the scraper frame, the scrapers being by this lifting raised nearly clear of the coal in the retort. When the scoops have run back clear of the coal in the retort, their projections $p$ by their action on the tappets $n^2$ as hereinbefore described lift the pawls $n$ and liberate the scraper frames so that the said frames and the scrapers will be free to be drawn back into the scoops by the action of the backing bar and cord or chain M in combination with the pulleys $l\ l'$ as hereinbefore explained. The scoops are now in position relatively to the hoppers to be refilled for a repetition of the charging operation when the main carriage shall have been moved to the next retort.

What I claim as my invention is—

1. The combination in a retort charging apparatus, of a main carriage for running along in front of the retorts, a scoop carriage arranged to run transversely upon the first mentioned carriage and having two or more scoop supports, scoops upon said supports, and locking devices for locking each scoop either to the scoop carriage or to the main carriage that it may either move with the scoop carriage or leave the latter free to move without it, substantially as herein set forth.

2. In a retort charging apparatus, the combination of a carriage having thereon two or more hoppers the delivery openings of which are one above another, troughs one for each hopper arranged opposite said openings to receive and retain coal therefrom, a scoop carriage arranged to run transversely upon the first mentioned carriage, two or more scoops arranged one above another on said scoop carriage at different levels below said troughs respectively and rotary scrapers one in each of said troughs, substantially as herein set forth.

3. The combination with the coal hopper having its throat at one side and a coal receiving and retaining trough outside of said throat, of a movable bar arranged in the upper part of the said throat and provided with projections for loosening the coal therein, substantially as and for the purpose herein set forth.

4. In a retort charging apparatus, the combination with a scoop carriage, of a coal scoop, a bearing on said carriage for said scoop on which said scoop is capable of vertical oscillation as a scale beam, and a weight applied to said scoop for weighing therein the coal to be deposited by it in a retort, substantially as herein set forth.

5. In a retort charging apparatus, the combination with a main carriage and a scoop carriage arranged to run on and transversely to said main carriage, of coal scoops, locking devices for locking said scoops to said main carriage in stationary relation thereto and in inoperative relation to the scoop carriage and rollers in said scoop carriage for supporting said scoops while so locked to the said main carriage, substantially as herein set forth.

6. The combination with a scoop and a carriage therefor and a roller on said carriage on which said scoop is capable both of moving longitudinally and of oscillating vertically as a scale beam, and a weight on said scoop for weighing the coal deposited therein, substantially as herein set forth.

7. The combination with the scoop and the scraper frame and scrapers therein, means of moving the scoop, scraper-frame and scrapers together into the retort, and means of producing a further forward movement of the scrapers within the scoop to push the coal back therein and therefrom to the back of the retort, substantially as herein set forth.

8. The combination with the main carriage and the scoop carriage arranged to run transversely thereon, of a scoop on the scoop carriage, a scraper frame and scrapers fitted to said scoop, a lever, as K, carried by the scoop carriage and bearing against the scraper frame, and a stop, as $k'$, on the main carriage for producing through said lever an accelerated forward movement of the scrapers relatively to the scoop as the latter completes its forward movement with the scoop carriage, substantially as herein set forth.

9. In a retort charging apparatus, the combination with a scoop and a scraper frame and scrapers therein and a carriage for placing the scoop in and withdrawing it from the retort, of a detaining device for detaining the scrapers while the scoop is withdrawn from the retort, a trip on the scoop for automatically disengaging said detaining device and means of drawing back the scrapers within the scoop after the withdrawal of the latter from the retort, substantially as herein set forth.

10. In a retort charging apparatus, the combination with a scoop and a scraper frame and scrapers therein, and a carriage for placing the scoop and scrapers in and withdrawing them from the retort, of a pawl for detaining the scraper frame while the scoops are being withdrawn from the retort, a backing-bar fitted to slide within the scoop and carrying a pulley, a second pulley attached to the scoop, a rope or chain passing around said pulleys and having its ends attached respectively to the scoop and the scraper frame and a stop behind said backing-bar, substantially as and for the purpose herein set forth.

11. In a retort charging apparatus, the combination of a main carriage and a scoop carriage running transversely thereon, a scoop on the latter carriage, a scraper frame and scrapers working within said scoop, a pawl $n$ attached to the main carriage for detaining the scraper frame while the scoop carriage and scoop move backward, a tappet piece $n^2$ pivoted to said pawl and a trip piece $p$ on the scoop for operation on the tappet piece to automatically disengage the pawl, substantially as herein set forth.

GASTON A. BRONDER

Witnesses:
FREDK. HAYNES,
GEORGE BARRY.